April 12, 1949.   I. E. LIGHTBOWN ET AL   2,467,322
TIE-GUM FOR POLYMER-RUBBER ARTICLES
Filed Dec. 7, 1940
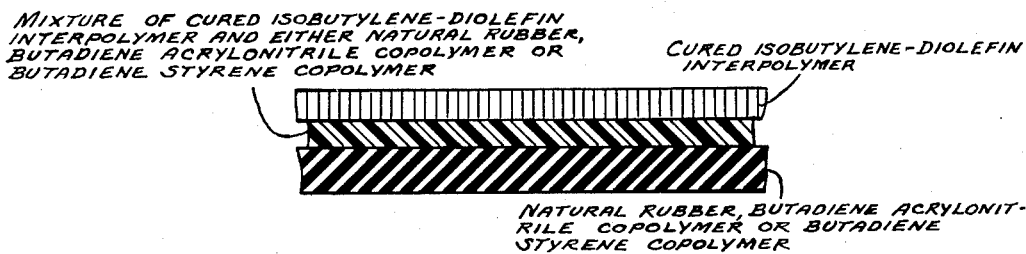
Irving E. Lightbown  Inventors
Nathan S. Beekley, Jr.
By  D. P. Young  Attorney.

Patented Apr. 12, 1949

2,467,322

UNITED STATES PATENT OFFICE 2,467,322

TIE GUM FOR POLYMER-RUBBER ARTICLES

Irving E. Lightbown, Roselle, and Nathan S. Beekley, Jr., Westfield, N. J., assignors, by mesne assignments, to Jasco, Incorporated, a corporation of Louisiana Application December 7, 1940, Serial No. 369,116

9 Claims. (Cl. 154—139)

1

This invention relates to rubbery materials; relates particularly to structures composed of a plurality of different types of rubber-like or rubbery materials; and relates especially to an interposed adherent layer, uniting bodies of chemically different rubbery or rubber-like or other synthetic, plastic materials.

In the production of plastic, elastic, rubbery structures, it is desirable for some purposes that a portion of the article should be made of one kind of plastic or rubbery material; that another portion of the article should be made of another kind of rubbery material; and that the two portions should be firmly adherent.

It is found, however, that natural rubber and the various rubber substitutes, and synthetic rubber substances differ so greatly in their chemical nature, and differ in their respective reactions to compounding, filling, curing and vulcanizing agents so greatly, that to the present it has been exceedingly difficult to cause bodies of different kinds of such plastic, elastic substances to adhere in a union, junction, or weld of adequate strength; since when bodies of the respective substances are cured in contact, in some instances they do not adhere at all, and in other instances the bond is too weak for any useful purpose.

The present invention utilizes a specially compounded tie-gum layer interposed between bodies of different kinds of plastic or rubbery material to produce the desired high-strength union, junction or weld therebetween.

Among the new, important and very valuable rubber-like substances is the new polymer or heteropolymer of an isoolefin and a diolefin, particularly isobutylene with a diolefin such as butadiene, isoprene, pentadiene, or dimethyl butadiene prepared by mixing the isoolefin and diolefin at a low temperature, and polymerizing the mixture to produce polymers having molecular weights in excess of 15,000 and molecular weights preferably ranging between 20,000 and 150,000.

Other valuable rubber-like polymers are those of butadiene, or butadiene with acrylonitrile or butadiene with styrene, produced by emulsion polymerization at temperatures slightly above room temperatures. These polymers are more nearly synthetic rubbers, since they have iodine numbers ranging up to about 350 in contrast to the isoolefin-diolefin polymer which has an iodine number usually within the range of 1 to about 40.

These materials can be cured by heating with sulfur, especially in the presence of specific organic disulfides which act as sulfurization aids. However, the conditions for curing the polymers, particularly the rate of cure and curing temperature of the isoolefin-diolefin interpolymer differ widely from those of rubber, and from the emulsion polymerizates which are much more nearly

2 like rubber. Accordingly, the processes for the cure of these polymers, and for the vulcanization of rubber are quite different, and attempts to cause bodies of the respective materials to adhere by curing them in simple contact do not give useful bonds. In the rubber art, it is possible to bond differently compounded rubber stocks together, and secure a good high strength bond, because of the fact that rubber is an active ingredient of all such stocks, and simple cementing by rubber cement is satisfactory. This, however, will not serve for the bonding of the isoolefin-diolefin polymer to rubber, or to the various butadiene polymers known as the "bunas," since the active ingredients are greatly different. No single-component substance has been found which will produce a useful bond between the isoolefin-diolefin polymer and the various natural and synthetic rubber substances.

Similar problems occur when attempts are made to bond such polymers as the polychloroprene known as "neoprene," and the alkyl chloride-sodium sulfide polymer known as "Thiokol," neither of which can be vulcanized with sulfur in any such manner as rubber is vulcanized.

In practicing the present invention, a composition or mixture is prepared containing in intimate admixture, suitable proportions of the active constituents of the respective rubber-like bodies which are to be bonded, and a sheet or layer of this mixture is interposed between the respective bodies of different kinds of rubbery materials. The whole body is then cured and vulcanized simultaneously, the so-called "tie-gum" layer serving to give a maximum strength and adhesion to and between the respective substances.

In most instances a single layer of the homogeneous mixture is adequate, but in some instances, better results are obtained by two or more layers of graded proportions, interposed between the main bodies of rubber-like substances.

Thus the invention contemplates the production of a composite article in which two different kinds of rubbery substances are united or joined together by a tie-gum layer which is made up of a mixture of the substances to be joined. Other objects and details of the invention will be apparent from the following description when read in connection with the accompanying drawing wherein:

The single figure shows a cross-section view of a laminated polymer structure according to the present invention.

The invention is applicable for the production of unions or welds between any of the various kinds of rubbery substances listed above, including natural rubber, the low temperature polymer of isoolefin-diolefins; the polymers of butadiene and of butadiene with other unsaturates; and the like. The composition of the tie-gum for high strength and adhesion depends upon the particular substances to the joined, which usually are the components from which the tie-gum is prepared; whether or not a solvent is necessary in the production of the mixture; whether more than one layer of interposed tie-gum is used; the effect of other ingredients such as sulfur, sulfurization aids, fillers and the like; the methods of mixing and producing the tie-gum substance, and the presence or absence of a preliminary, partial, or set cure of one or more of the bodies which are to be bonded.

The invention is particularly applicable to the production of bonds between natural rubber and a low temperature polymer of an isoolefin and a diolefin. This polymer is conveniently produced by mixing an isoolefin such as iso-butylene in a proportion ranging from 70 to 99 parts, with a diolefin, preferably a conjugated diolefin such as butadiene, isoprene, pentadiene or dimethyl butadiene or analogous substances in a proportion ranging from 30 parts to 1 part, together with a diluent refrigerant such as liquid ethylene in the proportion of from 100 to 600 parts, or a refrigerant such as solid carbon dioxide in excess, with or without a diluent such as ethyl or methyl chloride or other similar inert, low freezing, diluents. The polymerization reaction is conducted by the addition of a catalyst solution, preferably sprayed upon the surface of the rapidly stirred olefinic mixture, and preferably consisting of a solution of aluminum chloride in ethyl or methyl chloride or carbon disulfide or other non-complex-forming solvent. The polymerization reaction occurs rapidly in the presence of the catalyst to produce the desired interpolymer which preferably has a molecular weight ranging from 20,000 to 150,000 and an iodine number preferably ranging between 3, 4 or 5 and 9 or 10. The resulting polymer is desirably washed to remove undesired substances, and is then desirably compounded with sulfur, a sulfurization aid such as Tuads (tetramethyl thiuram disulfide) or other similar organic polysulfide and small proportions of zinc oxide, stearic acid, etc. This composition is readily cured by a heat treatment preferably at a temperature between 140° C. and 175° C. for a time interval ranging from 15 to 150 minutes.

The preparation and properties of this polymer are particularly well shown in U. S. Patent No. 2,356,128, patented August 22, 1944, on an application, Serial No. 300,336, filed October 20, 1939, by Thomas and Sparks.

From this composition, preferably in the uncured state, a "tie-gum" compound is prepared by mixing, on the mill, an appropriate amount of uncured natural rubber, and an appropriate amount of uncured polymer. It is found that if the amount of rubber is above 50 parts rubber to 50 parts of the polymer, the resulting composition will not adhere to the polymer, although it adheres excellently to the rubber. On the other hand, if the amount of the polymer is above 80 parts to 20 parts of rubber, the composition blisters very badly during the curing operation, and does not adhere to the rubber. Accordingly, the limiting or critical range of proportions is from about 50% of rubber with 50% of the polymer to about 80% of polymer to 20% of rubber, and the optimum ratio is approximately 60% of the polymer to 40% of rubber, this specific ratio being quite critical for maximum strength since the strength of the mixture after curing falls off very rapidly with change in proportion in either direction.

It should be noted, however, that this critical value varies to some extent with the type and quality of the natural rubber, and varies also with the type and quality of the synthetic polymer or interpolymer, depending particularly upon the proportion of diolefin in the polymer.

In addition it is desirable, although not essential, that a substantial proportion of carbon black be included in the composition, the maximum amount being approximately 100 parts by weight to 100 parts by weight of the mixed rubber and polymer. Also, it is desirable that substantial quantities of zinc oxide be present, ranging from 0.1 to about 8 parts per 100 parts of the mixture of polymer and rubber. Similarly, it is desirable that substantial quantity of a fatty acid such as stearic acid or oleic acid or other equivalent fatty acid be present, ranging from 0.1 to about 5 parts per 100 parts of mixed rubber and polymer. Likewise, it is desirable that a substantial amount of sulfur be present, ranging from one-half part to 5 parts per 100 parts of mixed rubber and polymer. In addition, it is highly desirable that a sulfurization aid such as Tuads (tetramethyl thiuram disulfide), or the metallic thio-carbamates or "Captax," which is mercaptobenzothiazole, or other commonly used rubber accelerators such as the guanidines, PbO, lime, etc., be present in the proportion of from 0.01 part to 3 parts per 100 parts of mixed rubber and the interpolymer.

The desired composition is prepared by a preliminary breakdown of the desired amount of rubber on the mill, preferably upon the open-roll mill; the addition of the polymer to the rubber on the mill, with sufficient milling to make a thorough mixture of the respective substances, the addition of the carbon black, zinc oxide and sulfur to the mix on the mill, and finally the addition of the Tuads or other accelerators at the last moment on the cool mill. The mixture may then be sheeted out and used as a "tie-gum" between layers of rubber and polymer, both being compounded with fillers, sulfur and the ordinary curing aids in the usual manner.

*Example 1*

A satisfactory "tie-gum" compound according to the invention may contain the following substances in the proportions indicated.

| | Parts |
|---|---|
| Isobutylene-butadiene copolymer [1] | 60.0 |
| Rubber (smoked sheets) | 40.0 |
| Carbon black ("Gastex") | 50.0 |
| Zinc oxide | 5.0 |
| Stearic acid | 2.0 |
| Sulfur | 2.0 |
| Tuads (tetramethyl thiuram disulfide) | 0.1 |

[1] A copolymer containing approximately 1% of butadiene.

The above polymer preferably contains approximately 1 molecule of butadiene to 99 molecules of isobutylene such as is obtained from a polymerization mixture containing 80 parts of isobutylene with 20 parts of butadiene. The above formula suggests carbon black as a filler, but many other fillers and pigments may be used such as whiting, barytes, clay, zinc sulfide, magnesium carbonate, lithopone, wood flour, and many other similar solids.

In preparing this composition, the rubber is put on the mill first and milled until plastic with only a small amount of breakdown. The polymer is then added to the rubber on the mill and the milling continued until a thorough mixture is obtained. During the mixing and milling the carbon black is added in small portions and thoroughly milled into the mixture. In addition, the zinc oxide and stearic acid are milled into the mixture during the course of the milling, preferably near the close of the milling operation. The sulfur also is added near the close of the mixing operation and as soon as the sulfur is well mixed in the mill is cooled, the Tuads added and mixed in as quickly as possible and the material removed quickly from the mill and cooled to avoid premature curing of the mixture.

This tie-gum composition cures readily to a strong, elastic substance which is firmly adherent both to vulcanized rubber and to cured isobutylenediolefin interpolymer, the preferred curing time and temperature being 15 to 60 minutes at a temperature ranging from 135° C. to about 175° C.

Example 2

In the construction of pneumatic tires it is sometimes convenient to prepare a tire carcass of the desired annular shape, the carcass being formed up from fabric, either square woven canvas or cord, which fabric may be made from cotton, linen, or synthetic silk cords or even metal wires, impregnated with or calendered with natural rubber containing sulfur, vulcanization accelerators, carbon black, zinc oxide, stearic acid and other of the usual rubber compound constituents as desired. To the carcass there may then be applied a layer of the tie-gum prepared as described in Example 1, and over the tie-gum there is then applied a layer of the isobutylene-butadiene polymer material, also compounded with carbon black, zinc oxide, stearic acid, sulfur and Tuads. The complete tire casing may be cured in a single operation, or the carcass may be partially vulcanized such as by a set cure and the tie-gum and copolymer tread cured by a second heat treatment; or since the curing operation on the copolymer requires a much more drastic heating operation than does the vulcanization of rubber, the polymer material tread may be cured first, then applied to the unvulcanized carcass with an interposed layer of tie-gum, and the whole casing given a second curing operation sufficient to vulcanize the rubber in the carcass, and complete the cure of the copolymer tread.

Example 3

Alternatively the invention may be utilized for the application to various structures of jackets made up of the copolymer material which is highly resistant to oxidation by ozone, air or other reactants and highly resistant to sunlight, ultraviolet light and heat, as well as highly resistant to flexure, abrasion, and other mechanically destructive influences. Articles in which this type of structure is particularly advantageous are pneumatic tires as above described; cables in which an insulation of rubber either new or reclaimed is protected by a jacket of polymer held in place by an intervening layer of tie-gum as above described; belts either for the transmission of power or conveyor belts, in which a fabric carcass impregnated with rubber is protected by a jacket of polymer in which instance the combination is particularly advantageous because of the high strength and high abrasion resistance of the polymer.

The structure is particularly advantageous for sand-blast hose because of the exceedingly high abrasion resistance of the polymer to sand or other solid particles, and for such uses as storage battery cases, in which it is possible to use "rubber reclaim" for the body of the box, in combination with a jacket or lining of the polymer material held in place by "tie-gum" according to the invention.

The construction of the invention is useful in practically any structure which is subjected to wear or chemical influences, in which flexibility is desired, since the body of the article may be prepared from natural rubber, and a protective jacket cemented in place by the tie-gum material of the invention.

Example 4

Alternatively, the tie-gum may be used in the form of a cement which may be prepared by dissolving the materials presented in the above compounding formula or composition in a suitable solvent such as benzene or petroleum naphtha. If all of the components of the above compounding formula are used, some of the inorganic substances, especially the zinc oxide and the carbon black are usually insoluble in solvent as is the sulfur unless special solvents are used. They may be omitted, or they may be retained as a suspension in the cement. Alternatively, a cement may be prepared according to the following formula:

|  | Parts |
|---|---|
| Tuads (tetramethyl thiuram disulfide) | 1.0 |
| Rubber (smoked sheets) | 40 |
| Isobutylene-butadiene copolymer | 60 |
| Stearic acid | 2 |
| Sulfur | 2 |
| Zinc oxide | 5-25 |
| Benzene | 1200 |
| Carbon black | 0-50 |

The cement may be used with or without a sulfurization aid such as the "Tuads" above mentioned. If the sulfurization aid is omitted, the curing action is aided by the diffusion of sulfurization aid from the copolymer compound or rubber in contact with the interposed tie-gum layer.

In the case of the cement, the proportions of parts may be varied to approximately the same extent as is indicated in Example 1, and the amount of benzene used as solvent may be varied between approximately 1000 parts and 2000 parts according to the desired viscosity of the cement.

In utilizing this form of the invention, the cement may be applied either to the rubber portion of the structure or to the polymer portion of the structure or to both, and allowed to dry until it is only slightly tacky. Thereafter the respective parts may be brought into contact in the desired relationship, and cured as above pointed out.

Example 5

The invention is similarly applicable for the bonding of the isobutylene-diolefin polymer to the butadiene polymers known as "buna." For this purpose, the tie-gum composition was prepared according to the following formula:

|  | Parts |
|---|---|
| Isobutyalene-butadiene copolymer | 60 |
| Perbunan | 40 |
| Channel black | 40 |
| Zinc oxide | 2.7 |
| Stearic acid | 1.6 |
| Sulfur | 0.8 |
| Accelerator (Tuads) | 0.1 |

This compound was readily prepared in substantially the same manner as described in Example 1. The polymer member was compounded as in Example 1, and the butadiene polymer, which may desirably be the "Perbunan" polymer of butadiene and acrylonitrile was compounded as shown in the following formula:

| | Parts |
|---|---|
| Perbunan | 100 |
| Channel black | 45 |
| Zinc oxide | 5 |
| Stearic acid | 2 |
| Sulfur | 1.5 |
| Santocure [1] | 0.25 |
| Diphenylguanidine | 0.25 |

[1] Condensation product of cyclohexylamine and mercaptobenzothiazole.

The desired member made up of the isobutylene-butadiene low temperature polymer was prepared, the "Perbunan" member was likewise prepared and the tie-gum layer was interposed between the two members. Thereafter the assemblage was cured at 155° C. for 30 minutes and a coherent blister-free structure was obtained with a strong, fully adequate bond between the isobutylene-diolefin polymer and the "Perbunan." In this instance also the ratio of active constituents was critical, ranging from 50 parts of isobutylene-diolefin polymer with 50 parts of "Perbunan" to a maximum of 80 parts of isobutylene-diolefin polymer with 20 parts of "Perbunan."

The polymer of butadiene with styrene, known as "Buna S" may be substituted for the "Perbunan," substantially without change in proportions or mode of action.

The invention is similarly applicable to polymers such as the polymer of chloroprene known as "neoprene," since it is found that the resistance of the "neoprene" polymer to sulfur does not prevent the curing of the sulfur-curable polymers, and in consequence a mixture of the compounded sulfur-curable polymer and the chloroprene polymer may be prepared, and utilized as a tie-gum between bodies of the sulfur-curable polymer and the chloroprene polymer. In some instances, it is necessary to cement the tie-gum layer to the chloroprene polymer member, and then cure the tie-gum in contact with the sulfur-curable member. This is applicable both to "neoprene," and to the reaction polymer produced from alkylene halides and sodium sulfide or polysulfide in which the sulfur is a constituent of the polymer, but the polymer does not vulcanize as does rubber.

With these non-curing polymers, the invention is applicable substantially without change for the bonding to the non-curing polymer of the isobutylene-diolefin polymer and also the "buna" polymers as well as natural rubber.

It may be noted that different batches of materials vary somewhat, and variations in the compounding formula are desirable to match the variations in characteristics of the polymers and accordingly for best results, several trials of compositions having varying proportions are necessary, in view of the lack of assay methods for determining the characteristics of the various batches of polymer in terms of response and interaction with rubber or other polymers.

In addition, there are occasional instances in which it is desirable to provide structures consisting of a plastic member and an attached hard resin member. For this purpose similar tie-gum formulae are prepared containing the desired plastic polymer in admixture with the desired hard resin, the structure being assembled with a layer of tie-gum between the hard resin and the plastic polymer, or synthetic rubber.

This structure is particularly advantageous for such structures as tanks lined with acidproof layers since some of the hard resins such as Bakelite, or some of the drying oils or baking varnishes such as tung oil, etc., are readily caused to adhere very firmly to metal surfaces, and a plastic such as the isobutylene-butadiene copolymer is readily attached to the coating upon the metal surface through the agency of a tie-gum containing mixtures of the copolymer with various of the hard resins.

In some instances more than one tie-gum layer is required, since some of the resins are incompatible with the plastic polymers while others are not.

To secure better adhesion in some cases it is advantageous to use 3 or more layers of the tie-gum; the layer against the rubber having 50 parts rubber, the layer against the isobutylene-butadiene polymer having only 20 parts of rubber and the intermediate layer say 60 polymer to 40 natural rubber.

Thus the invention provides a structure consisting of different plastic or resinous members united together through the agency of a tie-gum layer containing mixtures in critical proportions of the substances to be united together, and containing in addition appropriate curing agents, curing aids, pigments and similar strengthening, reinforcing, and adhesive substances.

While there are above disclosed but a limited number of embodiments of the invention, it is possible to produce still other embodiments without departing from the inventive concept herein disclosed, and it is therefore desired that only such limitations be imposed upon the appended claims as are stated therein.

The invention claimed is:

1. An article of manufacture comprising a triply laminated structure, one of said laminae comprising a synthetic solid hydrocarbon interpolymer of a major proportion of isobutylene with a minor proportion of a conjugated diolefin having 4 to 8 inclusive carbon atoms per molecule, the polymer being characterized by a low unsaturation below an iodine number of 50, a molecular weight above 15,000 and reactivity with sulfur to yield an elastic product; a second lamina comprising natural rubber; and a third, interposed, lamina comprising a mixture of the isobutylene polymer and the natural rubber within the critical range between 50 parts of each to 80 parts of the isobutylene polymer with 20 parts of the rubber.

2. An article of manufacture comprising a triply laminated structure, one of said laminae comprising a synthetic solid hydrocarbon interpolymer of a major proportion of isobutylene with a minor proportion of a conjugated diolefin having 4 to 8 inclusive carbon atoms per molecule, the polymer being characterized by a low unsaturation below an iodine number of 50, a molecular weight about 15,000 and reactivity with sulfur to yield an elastic product; a second lamina comprising an emulsion interpolymer of butadiene with acrylonitrile; and a third, interposed, lamina comprising a mixture of the isobutylene polymer and the second polymer within the critical range between 50 parts of each to 80 parts of the isobutylene polymer with 20 parts of the second polymer.

3. An article of manufacture comprising a triply laminated structure, one of said laminae comprising a synthetic solid hydrocarbon interpolymer of a major proportion of isobutylene with a minor proportion of a conjugated diolefin having 4 to 8 inclusive carbon atoms per molecule, the polymer being characterized by a low unsaturation below an iodine number of 50, a molecular weight above 15,000 and reactivity with sulfur to yield an elastic product; a second lamina comprising an emulsion interpolymer of butadiene and styrene; and a third, interposed, lamina comprising a mixture of the isobutylene polymer and the second polymer within the critical range between 50 parts of each to 80 parts of the isobutylene polymer with 20 parts of the second polymer.

4. An article of manufacture comprising a triply laminated structure, one of said laminae comprising a synthetic solid hydrocarbon interpolymer of a major proportion of isobutylene with a minor proportion of isoprene, the polymer being characterized by a low unsaturation below an iodine number of 50, a molecular weight above 15,000 and reactivity with sulfur to yield an elastic product; a second lamina comprising natural rubber; and a third, interposed, lamina comprising a mixture of the isobutylene polymer and the second polymer within the critical range between 50 parts of each to 80 parts of the isobutylene polymer with 20 parts of the second polymer.

5. An article of manufacture comprising a triply laminated structure, one of said laminae comprising a synthetic solid hydrocarbon interpolymer of a major proportion of isobutylene with a minor proportion of isoprene, the polymer being characterized by a low unsaturation below an iodine number of 50, a molecular weight above 15,000 and reactivity with sulfur to yield an elastic product; a second lamina comprising an emulsion interpolymer of butadiene with acrylonitrile; and a third, interposed, lamina comprising a mixture of the isobutylene polymer and the second polymer within the critical range between 50 parts of each to 80 parts of the isobutylene polymer with 20 parts of the second polymer.

6. An article of manufacture comprising a triply laminated structure, one of said laminae comprising a synthetic solid hydrocarbon interpolymer of a major proportion of isobtuylene with a minor proportion of isoprene, the polymer being characterized by a low unsaturation below an iodine number of 50, a molecular weight above 15,000 and reactivity with sulfur to yield an elastic product; a second lamina comprising an emulsion interpolymer of butadiene and styrene; and a third, interposed lamina comprising a mixture of the isobutylene polymer and the second polymer within the critical range between 50 parts of each to 80 parts of the isobutylene polymer with 20 parts of the second polymer.

7. The method of preparing a laminar elastic structure utilizing as one of the laminae a solid plastic hydrocarbon interpolymer prepared by the steps of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in an organic solvent characterized by less than 3 carbon atoms per molecule, a freezing point below $-50°$ C. and non reactivity with aluminum chloride, comprising the steps of mixing together a portion of this polymer and a second high molecular weight polymer, comprising natural rubber, within the critical ratio between 50 parts of each and 80 parts of the isoolefinic polymer with 20 parts of the second polymer, and interposing a lamina of the mixture between the two respective polymers.

8. The method of preparing a laminar elastic structure utilizing as one of the laminae a solid plastic hydrocarbon interpolymer prepared by the steps of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in an organic solvent characterized by less than 3 carbon atoms per molecule, a freezing point below $-50°$ C. and non reactivity with aluminum chloride, comprising the steps of mixing together a portion of this polymer and a second high molecular weight polymer, comprising an emulsion interpolymer of butadiene and acrylonitrile, within the critical ratio between 50 parts of each and 80 parts of the isoolefinic polymer with 20 parts of the second polymer, and interposing a lamina of the mixture between the two respective polymers.

9. The method of preparing a laminar elastic structure utilizing as one of the laminae a solid plastic hydrocarbon interploymer prepared by the steps of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in an organic solvent characterized by less than 3 carbon atoms per molecule, a freezing point below $-50°$ C. and non reactivity with aluminum chloride, comprising the steps of mixing together a portion of this polymer and a second high molecular weight polymer, comprising an emulsion interpolymer of butadiene and styrene, within the critical ratio between 50 parts of each and 80 parts of the isoolefinic polymer with 20 parts of the second polymer, and interposing a lamina of the mixture between the two respective polymers.

IRVING E. LIGHTBOWN.
NATHAN S. BEEKLEY, Jr.

REFERENCES CITED

The following references are of record in the file of this patent:

UNITED STATES PATENTS

| Number | Name | Date |
| --- | --- | --- |
| 1,998,827 | Worrell | Apr. 23, 1935 |
| 2,123,155 | Groff | July 5, 1938 |
| 2,138,895 | Wiezebich | Dec. 6, 1938 |
| 2,170,947 | Habgood et al. | Aug. 29, 1939 |
| 2,213,423 | Wiezebich | Sept. 3, 1940 |
| 2,227,900 | Habgood et al. | Jan. 7, 1941 |
| 2,271,125 | Juve | Jan. 27, 1942 |
| 2,278,802 | Sarbach | Apr. 7, 1942 |
| 2,332,194 | Beekley et al. | Oct. 19, 1943 |
| 2,418,025 | Garvey | Mar. 25, 1947 |

FOREIGN PATENTS

| Number | Country | Date |
| --- | --- | --- |
| 513,521 | Great Britain | Oct. 16, 1939 |